(12) United States Patent
Matsumoto et al.

(10) Patent No.: US 8,039,155 B2
(45) Date of Patent: Oct. 18, 2011

(54) FUEL-CELL SYSTEM AND METHOD OF CONTROLLING FUEL CELL

(75) Inventors: Yuji Matsumoto, Saitama (JP); Kenichiro Ueda, Saitama (JP); Junji Uehara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1374 days.

(21) Appl. No.: 11/598,428

(22) Filed: Nov. 13, 2006

(65) Prior Publication Data

US 2007/0111050 A1   May 17, 2007

(30) Foreign Application Priority Data

Nov. 16, 2005  (JP) .................................. 2005-331611

(51) Int. Cl.
*H01M 8/04* (2006.01)
(52) U.S. Cl. .................. 429/428; 429/430; 429/443
(58) Field of Classification Search .................. None
See application file for complete search history.

(56) References Cited

U.S. PATENT DOCUMENTS

2003/0049503 A1 * 3/2003 Ballantine et al. ............. 429/22

FOREIGN PATENT DOCUMENTS

| JP | 2002-50377 | 2/2002 |
|---|---|---|
| JP | 2003-282115 | 10/2003 |
| JP | 2004-207029 | 7/2004 |
| JP | 2004-273162 | 9/2004 |
| JP | 2004-288496 | 10/2004 |
| JP | 2005-093218 | 4/2005 |

OTHER PUBLICATIONS

IPDL PAJ JPO machine translation for JP 2004-273162, Takashi, Ino, May 3, 2003.*
Japanese Office Action for Application No. 2005-331611, dated Mar. 16, 2010.

* cited by examiner

*Primary Examiner* — Barbara Gilliam
*Assistant Examiner* — Adam A Arciero
(74) *Attorney, Agent, or Firm* — Nelson Mullins Riley & Scarborough LLP; Anthony A. Laurentano

(57) ABSTRACT

A fuel-cell system is provided, which includes a fuel cell, a reactive-gas supply unit and a control unit. The reactive-gas supply unit supplies the reactive gases to the fuel cell. The control unit includes an average stoichiometric flow-ratio calculation part and a reactive-gas reduction part. The average stoichiometric flow-ratio calculation part calculates an average stoichiometric flow ratio by averaging stoichiometric flow ratios. A stoichiometric flow ratio is a ratio of an amount of the reactive gases supplied to the fuel cell with respect to a required amount of the reactive gases of the fuel cell in accordance with a required amount of power generation. When the average stoichiometric flow ratio is equal to or greater than a first predetermined value, the reactive-gas reduction part reduces the amount of the reactive gases supplied to the fuel cell so as to lower the stoichiometric flow ratio.

3 Claims, 4 Drawing Sheets

FUEL-CELL SYSTEM AND METHOD OF CONTROLLING FUEL CELL

This application is based on and claims the benefit of priority from Japanese Patent Application No. 2005-331611, filed on Nov. 16, 2005, the content of which is incorporated herein by reference.

BACKGROUND OF THE INVENTION

1. Field of the Invention

The present invention relates to a fuel-cell system and a method of controlling a fuel cell, and more particularly, to a fuel-cell system and a method of controlling a fuel cell mounted on automotive vehicles.

2. Related Art

In recent years, fuel-cell systems gain the spotlight as a new power source of automotive vehicles. For example, a fuel-cell system includes a fuel cell for generating power by chemical reaction of reactive gases, a reactive-gas supply unit for supplying the reactive gases to the fuel cell through a reactive-gas passage, and a control unit for controlling the reactive-gas supply unit.

The fuel cell has a stack structure in which tens to hundreds of cells are stacked, for example. Each cell has a membrane electrode assembly (MEA) interposed by a pair of separators. The MEA includes two electrodes, i.e., an anode electrode and a cathode electrode, and a solid high-polymer electrolyte membrane interposed by the electrodes.

When supplying hydrogen gas as a reactive gas to the anode electrode and air containing oxygen as a reactive gas to the cathode electrode, the fuel cell generates power by electrochemical reaction. Since only harmless water is fundamentally produced during this power generation, the fuel cells gain the spotlight from the viewpoint of influence on the environment and efficiency.

In the fuel-cell system, the reactive gases such as hydrogen gas, air, etc. are supplied to one end of a casing in which the cells of stacked structure are accommodated, and are discharged from the other end. Therefore, when supplying an amount of reactive gases required for power generation, a sufficient amount of reactive gases is supplied to the cells in the vicinity of an inlet of the reactive gases, but not to the cells in the vicinity of an outlet of the reactive gases, leading to possible occurrence of variation in the power-generation efficiency of the cells.

In order to efficiently generate power in all the cells, a greater amount of reactive gases than a theoretical amount required for power generation is supplied to the fuel cell.

Specifically, assuming that a minimally required amount of reactive gases calculated in accordance with a required amount of power generation is a required amount of reactive gases, a rate of an amount of reactive gases supplied to the fuel cell with respect to the required amount of reactive gases is set as a stoichiometric flow ratio. The reactive gases are supplied so that the stoichiometric flow ratio has a constant value.

However, even if the stoichiometric flow ratio is set to a constant value, variation may occur in the power-generation efficiency of the cells due to influence of operation loads and secular changes.

In order to solve this problem, a system is proposed wherein when variation occurs in the generated voltage of the cells constituting the fuel cell, it is determined whether the cause lies in deviation of the distribution of reactive gases in the fuel cell or the degradation of the cells, and a target stoichiometric flow ratio of reactive gases is set in accordance with the result of this determination (refer to Japanese Unexamined Patent Application Publication No. 2004-207029 (Patent Document 1)).

With the fuel-cell system proposed by Patent Document 1, when the cause of variation in generated voltage of the cells lies in deviation of the distribution of reactive gases, a slightly greater stoichiometric flow ratio than an optimal stoichiometric flow ratio is set as a target value in consideration of safety factors. With this, a sufficient amount of reactive gases can be supplied to the fuel cell, achieving stabilization of the generated voltage and an enhancement in fuel consumption.

With the system of Patent Document 1, however, since the stoichiometric flow ratio is slightly greater than the optimal stoichiometric flow ratio that can stabilize the generated voltage, power consumption of a compressor for supplying air to the cells increases, leading to a possible reduction in fuel efficiency of the fuel cell.

In order to solve this problem, a fuel-cell system is desired in which the stoichiometric flow ratio can be reduced as much as possible to allow a further enhancement in fuel consumption. Therefore, a fuel-cell system is proposed in which the stoichiometric flow ratio of reactive gases is changed dynamically, and the voltage of the fuel cells is detected to determine whether or not a current stoichiometric flow ratio is appropriate to stably maintain the voltage of the fuel cell (refer to Japanese Unexamined Patent Application Publication No. 2005-093218 (Patent Document 2)).

According to the fuel-cell system proposed by Patent Document 2, whether or not the stoichiometric flow ratio is appropriate is determined in accordance with the voltage of the fuel cell when the stoichiometric flow ratio of reactive gases is changed. Therefore, by reducing the stoichiometric flow ratio while observing the stability of power generation of the fuel cell, it is possible to maintain the stability of power generation and reduce the stoichiometric flow ratio as much as possible, leading to an increase in the fuel efficiency of the fuel cell.

However, in order to reduce the stoichiometric flow ratio as much as possible, the stoichiometric flow ratio should frequently be lowered to such an extent that power generation becomes unstable, resulting in an unstable power-generation capacity of the fuel cell.

SUMMARY OF THE INVENTION

An object of the present invention is to provide a fuel-cell system and a method of controlling a fuel cell, which allow for stabilization of the power-generation capacity as well as an enhancement in fuel consumption.

According to a first aspect of the present invention, a fuel-cell system is provided which includes a fuel cell, a reactive-gas supply unit and a control unit. The fuel cell generates power by a reaction of reactive gases. The reactive-gas supply unit supplies the reactive gases to the fuel cell. The control unit, which controls the supply unit, includes an average stoichiometric flow-ratio calculation part and a reactive-gas reduction part. The average stoichiometric flow-ratio calculation part calculates an average stoichiometric flow ratio as an index indicative of stability of power generated by the fuel cell, the average stoichiometric flow ratio decreasing when a stoichiometric flow ratio has not reached a target stoichiometric flow ratio and increasing when the stoichiometric flow ratio meets the target stoichiometric flow ratio. A stoichiometric flow ratio is a ratio of an amount of reactive gases supplied to the fuel cell with respect to a required amount of reactive gases of the fuel cell in accordance with a required amount of power generation. When the calculated average stoichiometric flow ratio is equal to or greater than a first predetermined value by which the fuel cell is determined to be in stable condition to perform power generation, the reactive-gas reduction part reduces the amount of reactive gases supplied to the fuel cell so as to lower the stoichiometric flow ratio.

The reactive gases include, for example, hydrogen gas and air containing oxygen.

For example, an average stoichiometric flow ratio greater than a ratio which allows the fuel cell stable power generation, i.e., the average stoichiometric flow ratio which ensures stable power generation with safety factors, is set as the first predetermined value.

According to the first aspect of the present invention, when the average stoichiometric flow ratio is equal to or greater than the first predetermined value, it is possible to allow an enhancement in fuel consumption of the fuel cell by reducing the amount of reactive gases supplied. Particularly, when supplying the reactive gases to the fuel cell using a compressor, power supplied to the compressor can be reduced, leading to a further reduction in power consumption of the fuel cell.

At this moment, the average stoichiometric flow ratio calculation part calculates the average stoichiometric flow ratio that decreases when the stoichiometric flow ratio has not reached the target stoichiometric flow ratio and increases when the stoichiometric flow ratio meets the target stoichiometric flow ratio. Because the stoichiometric flow ratio is changed using the average stoichiometric flow ratio as an index, it is possible to prevent frequent changes of the stoichiometric flow ratio so as to allow stabilization of the power-generation capacity of the fuel cell.

According to a second aspect of the present invention, the control unit further includes a reactive-gas reduction stop part. The reactive-gas reduction stop part stops the operation of the reactive-gas reduction part when the reactive-gas reduction part is in operation and the average stoichiometric flow ratio falls to or below a second predetermined value, which is smaller than the first predetermined value.

For example, an average stoichiometric flow ratio allowing the fuel cell stable power generation is set as the second predetermined value.

According to the second aspect of the present invention, the average stoichiometric flow ratio can be prevented from being equal to or smaller than the second predetermined value. When power generation is shifting from a stable state to an unstable state, the reactive-gas reduction stop part causes the reactive-gas reduction part to stop reducing the amount of reactive gases supplied, allowing stabilization of power-generation capacity of the fuel cell.

According to a third aspect of the present invention, the control unit further includes a reactive-gas reduction prohibition part that prohibits reoperation of the reactive-gas reduction part before a predetermined time has elapsed after stopping of the operation of the reactive-gas reduction part by the reactive-gas reduction stop part.

If the operation of the reactive-gas reduction part is allowed immediately after stopping of the reactive-gas reduction part, the average stoichiometric flow ratio may frequently vary between the first and second predetermined values during a short period of time. Because the average stoichiometric flow ratio may frequently fall to the second predetermined value, power generation may result in an unstable condition.

According to the third aspect of the present invention, reoperation of the reactive-gas reduction part is prohibited before the predetermined time has elapsed after stopping of the operation of the reactive-gas reduction part. In this way, it is possible to prevent the average stoichiometric flow ratio from consecutively falling to the second predetermined value so as to avoid unstable power generation.

According to a fourth aspect of the present invention, a method of controlling a fuel cell for generating power by reaction of reactive gases is provided, the method including: calculating a target stoichiometric flow ratio required for power generation where a stoichiometric flow ratio is defined as a ratio of an amount of a reactive gas to be supplied to the fuel cell to a necessary amount of the reactive gas in accordance with a required amount of power generation; controlling an amount of reactive gas supplied to the fuel cell so that a stoichiometric flow ratio meets the target stoichiometric flow ratio; calculating an average stoichiometric flow ratio as an index indicative of stability of power generated by the fuel cell, the average stoichiometric flow ratio decreasing when the stoichiometric flow ratio has not reached the target stoichiometric flow ratio and increasing when the stoichiometric flow ratio meets the target stoichiometric flow ratio; and reducing the amount of the reactive gas supplied to the fuel cell so as to lower the stoichiometric flow ratio, when the calculated average stoichiometric flow ratio is equal to or greater than a first predetermined value by which the fuel cell is determined to be in stable condition to perform power generation.

According to the fourth aspect of the present invention, the same effect as that of the first aspect of the present invention can be obtained.

According to the present invention, it is possible to prevent the average stoichiometric flow ratio from being equal to or greater than the first predetermined value so as to allow an enhancement in fuel consumption. Particularly, when supplying the reactive gases to the fuel cell using a compressor, power supplied to the compressor can be reduced, so that it is possible to further reduce power consumption of the fuel cell. Moreover, since the stoichiometric flow ratio is prevented from being changed frequently, stabilization of the power-generation capacity of the fuel cell can be achieved.

DETAILED DESCRIPTION OF THE INVENTION

Figure 1:
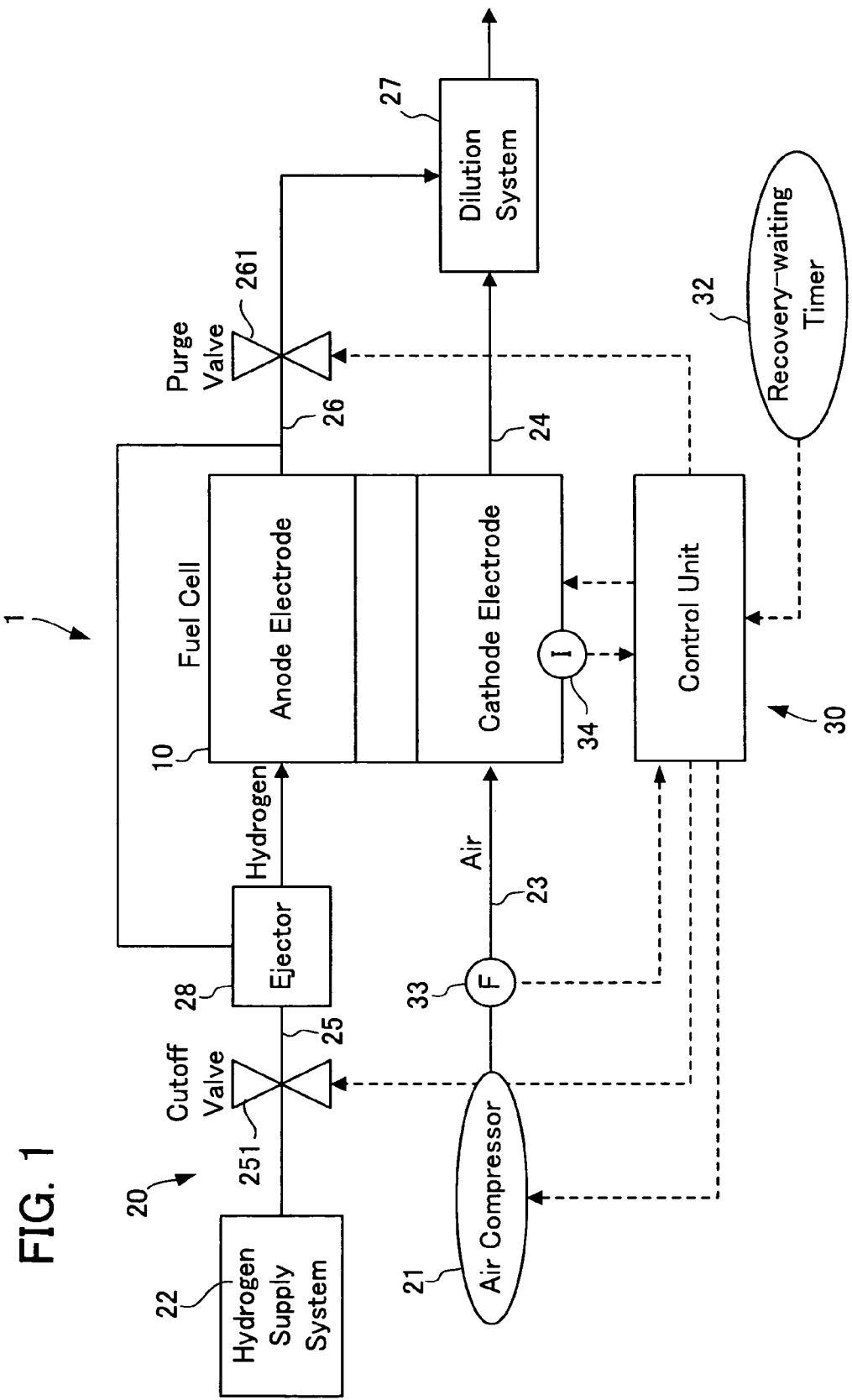
FIG. 1 is a block diagram showing a fuel-cell system according to an embodiment of the present invention.
Figure 2:
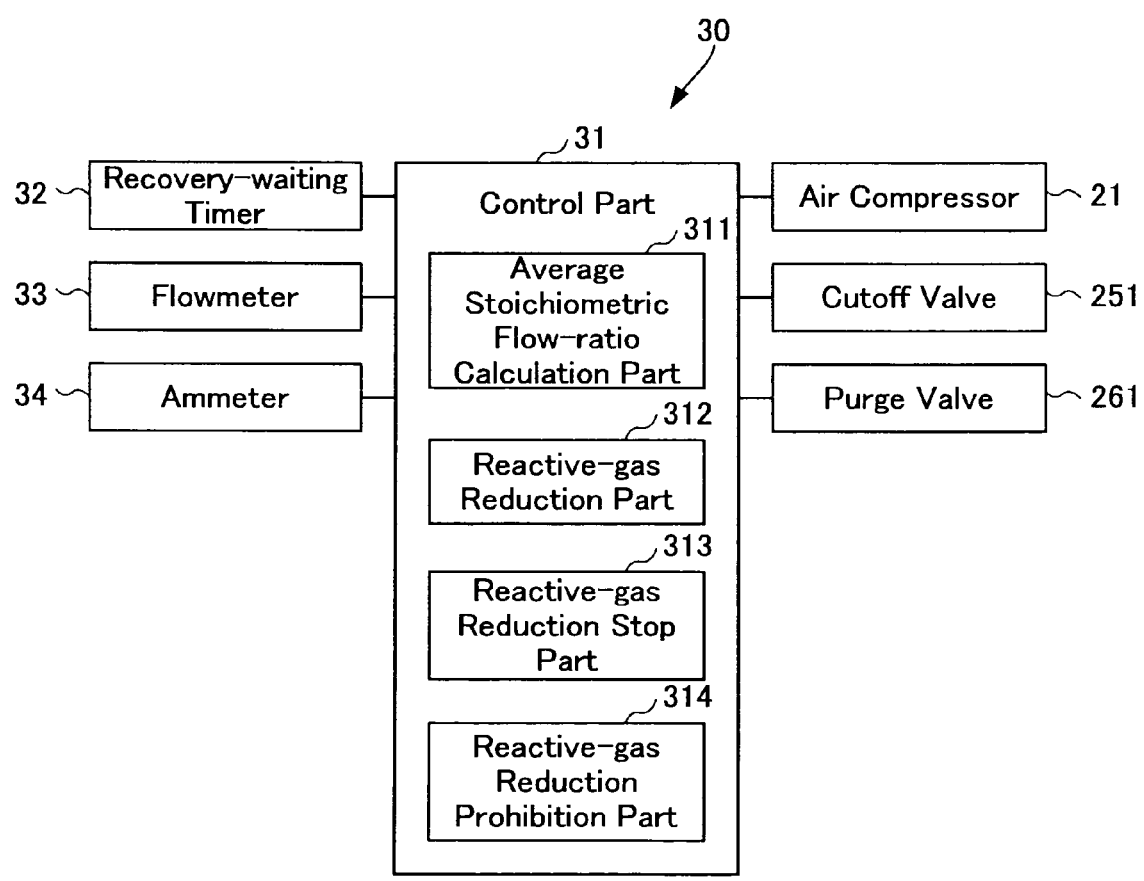
FIG. 2 is a block diagram showing a control unit constituting the fuel-cell system according to the embodiment.

Referring to the drawings, an embodiment of the present invention will be described hereafter.

As shown in FIG. 1, a fuel-cell system 1 includes a fuel cell 10, a reactive-gas supply unit 20 for supplying hydrogen gas and air as reactive gases to the fuel cell 10, and a control unit 30 for controlling the supply unit 20.

The fuel cell 10 has a stack structure in which tens to hundreds of cells are stacked, for example. Each cell has a membrane electrode assembly (MEA) sandwiched by a pair of separators. The MEA includes two electrodes, i.e., an anode electrode and a cathode electrode, and a solid high-polymer electrolyte membrane sandwiched by the electrodes. Typically, both electrodes are composed of a catalyst layer that is in contact with the solid high-polymer electrolyte membrane to perform oxidation-reduction reaction and a gas diffusion layer that is in contact with the catalyst layer.

When supplying hydrogen gas as a reactive gas to the anode electrode and air containing oxygen as a reactive gas to the cathode electrode, the fuel cell 10 generates power by an electrochemical reaction.

The fuel cell 10 also includes an ammeter 34.

The supply unit 20 includes an air compressor 21, a hydrogen supply system 22, an ejector 28 and a dilution system 27. The air compressor 21 supplies air to the cathode electrode of the fuel cell 10. The hydrogen supply system 22 and ejector 28 supply hydrogen gas to the anode electrode of the fuel cell 10. The dilution system 27 dilutes hydrogen gas discharged from an anode side of the fuel cell 10 with air discharged from a cathode side.

The air compressor 21 is connected to the cathode electrode of the fuel cell 10 through an air supply passage 23. A flowmeter 33 is provided in the air supply passage 23.

An air discharge passage 24 is connected to the cathode electrode of the fuel cell 10, and has an end portion connected to the dilution system 27.

The hydrogen supply system 22 is a hydrogen tank, for example, and is connected to the anode electrode of the fuel cell 10 through a hydrogen supply passage 25. A cutoff valve 251 is provided in the hydrogen supply passage 25. The ejector 28 is provided in the hydrogen supply passage 25, lying closer to the anode electrode than the cutoff valve 251.

A hydrogen discharge passage 26 is connected to the anode electrode of the fuel cell 10, and also to the dilution system 27. A purge valve 261 is provided in the hydrogen discharge passage 26 that is normally closed by the purge valve 261. The hydrogen discharge passage 26 is branched off at a point between the purge valve 261 and the anode electrode, so that a branch passage is connected to the ejector 28.

The ejector 28 collects hydrogen gas flowing into the hydrogen discharge passage 26 through the branch passage thereof, and circulates collected hydrogen gas back to the hydrogen supply passage 25.

The dilution system 27 dilutes hydrogen gas discharged from the hydrogen discharge passage 26 with air discharged from the air discharge passage 24, and discharges the diluted hydrogen gas.

The air compressor 21, cutoff valve 251, and purge valve 261 described above are connected to the control unit 30 to be described later.

Description is given of steps for power generation by the fuel cell 10.

With the purge valve 261 closed and the cutoff valve 251 opened at an appropriate opening degree, hydrogen gas is supplied from the hydrogen supply system 22 to the anode side of the fuel cell 10 through the hydrogen supply passage 25. Air is supplied to the cathode side of the fuel cell 10 through the air supply passage 23 by driving the air compressor 21.

Hydrogen gas and air supplied to the fuel cell 10 serve to generate power, and flow into the hydrogen discharge passage 26 and the air discharge passage 24 from the fuel cell 10 together with remaining water such as produced water on the anode side and the like. Since the purge valve 261 is closed at this moment, the hydrogen gas that flowed into the hydrogen discharge passage 26 is circulated back to the ejector 28 for recycling.

Then, with the purge valve 261 opened at an appropriate opening degree, hydrogen gas, air, and the remaining water are discharged from the hydrogen discharge passage 26 and the air discharge passage 24. It should be noted that the hydrogen gas is diluted by the dilution system 27 at a predetermined concentration or less.

The control unit 30 includes a control part 31, as well as a recovery-waiting timer 32, flowmeter 33, and ammeter 34 that are connected to the control part 31.

When set by the control part 31, the recovery-waiting timer 32 transmits a remaining time with respect to a predetermined set time to the control part 31.

The flowmeter 33 measures a flow rate of air flowing through the air supply passage 23, and transmits the measured flow rate to the control part 31.

The ammeter 34 measures a current value of power generated by the fuel cell 10, and transmits the measured current value to the control part 31.

The control part 31 calculates a target stoichiometric flow ratio according to an amount of hydrogen gas to be supplied to the fuel cell 10 and a necessary amount of hydrogen gas based on required power generation. The control part 31 fundamentally controls the supply unit 20 so that a stoichiometric flow ratio is equal to the target value set in advance. Simultaneously, in accordance with a current value measured by the ammeter 34, the control part 31 controls the amount of hydrogen gas and air required for power generation.

The control part 31 includes an average stoichiometric flow-ratio calculation part 311, a reactive-gas reduction part 312, a reactive-gas reduction stop part 313, and a reactive-gas reduction prohibition part 314.

The average stoichiometric flow-ratio calculation part 311 calculates an average stoichiometric flow ratio that decreases when the stoichiometric flow ratio has not reached the target stoichiometric flow ratio and increases when the stoichiometric flow ratio meets the target stoichiometric flow ratio.

The reactive-gas reduction part 312 reduces an amount of reactive gases supplied to the fuel cell 10 so as to lower a stoichiometric flow ratio when the average stoichiometric flow ratio is equal to or greater than a first predetermined value 1H.

Under a condition where the first predetermined value 1H is satisfied, an average stoichiometric flow ratio is substantially equal to the target value. Therefore, it is understood that fully stable power generation can be implemented.

The reactive-gas reduction stop part 313 stops operation of the reactive-gas reduction part 312 when the reactive-gas reduction part 312 is in operation and the average stoichiometric flow ratio falls to or below a second predetermined value 1L that is smaller than the first predetermined value 1H.

The reactive-gas reduction prohibition part 314 continuously sets the recovery-waiting timer 32 during the operation of the reactive-gas reduction part 312. When operation of the reactive-gas reduction part 312 is stopped by the reactive-gas reduction stop part 313, the reactive-gas reduction prohibition part 314 sets the recovery-waiting flag to 1. While the recovery-waiting flag is 1, the reactive-gas reduction prohibition part 314 prohibits operation of the reactive-gas reduction part 312. The reactive-gas reduction prohibition part 314 receives a remaining time from the recovery-waiting timer 32 after setting the recover-waiting flag to 1. When the remaining time becomes 0, the reactive-gas reduction prohibition part 314 sets the recovery-waiting flag to 0 so as to allow operation of the reactive-gas reduction part 312.

Figure 3:
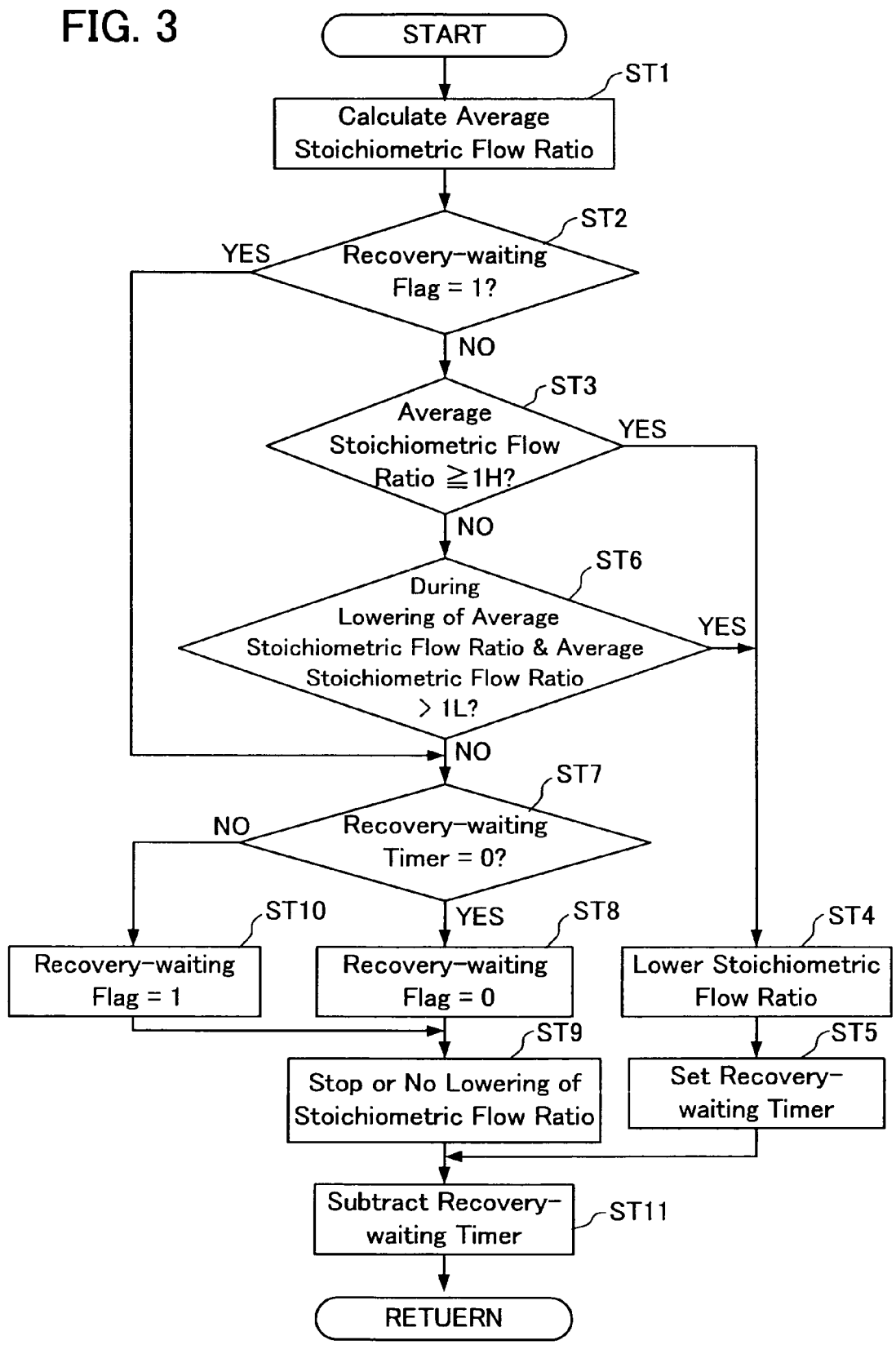
FIG. 3 is a flowchart showing operation of the fuel-cell system according to the embodiment.

Referring to FIG. 3, the operation of the fuel-cell system 1 will be described.

First, the average stoichiometric flow-ratio calculation part 311 calculates an average stoichiometric flow ratio (step ST1). The reactive-gas reduction prohibition part 314 determines whether or not a recovery-waiting flag is 1 (step ST2). In this connection, an initial value of the recovery-waiting flag is 0. When the determination is "YES", flow proceeds to step ST7 to be described later. When the determination is "NO", the reactive-gas reduction part 312 determines whether or not the average stoichiometric flow ratio is equal to or greater than the first predetermined value 1H (step ST3).

When the determination at step ST3 is "YES", the reactive-gas reduction part 312 reduces the amount of hydrogen gases supplied to the fuel cell 10 so as to lower the stoichiometric flow ratio (step ST4). Also, the reactive-gas reduction part 312 sets the recovery-waiting timer 32 (step ST5). The recovery-waiting timer 32 starts a subtraction (step ST11).

On the other hand, when the determination at step ST3 is "NO", the reactive-gas reduction stop part 313 determines whether or not the reactive-gas reduction part 312 is in operation and the average stoichiometric flow ratio is falling, and whether or not the average stoichiometric flow ratio exceeds the second predetermined value 1L that is smaller than the first predetermined value 1H (step ST6). When the determination is "YES", flow proceeds to step ST4, whereas when the determination is "NO", the reactive-gas reduction stop part 313 determines whether or not the recovery-waiting timer is 0 (step ST7). When the determination at step ST7 is "YES", the reactive-gas reduction prohibition part 314 sets the recovery-waiting flag to 0 (step ST8), and then flow proceeds to step ST9. On the other hand, when the determination at step ST7 is "NO", the reactive-gas reduction prohibition part 314 sets the recovery-waiting flag to 1 (step ST10), and then flow proceeds to step ST9.

At step ST9, when the reactive-gas reduction part 312 is in operation, it is apparent from the determination at step ST6 that the average stoichiometric flow ratio has fallen to or below the second predetermined value 1L. The reactive-gas reduction stop part 313 stops operation of the reactive-gas reduction part 312. Then, flow proceeds to step ST11. On the other hand, when the reactive-gas reduction part 312 is not in operation, it is apparent from the determination at step ST3 that the average stoichiometric flow ratio is smaller than the first predetermined value 1H. Thus, leaving the reactive-gas reduction part 312 in no operation, flow proceeds to step ST11.

Figure 4:
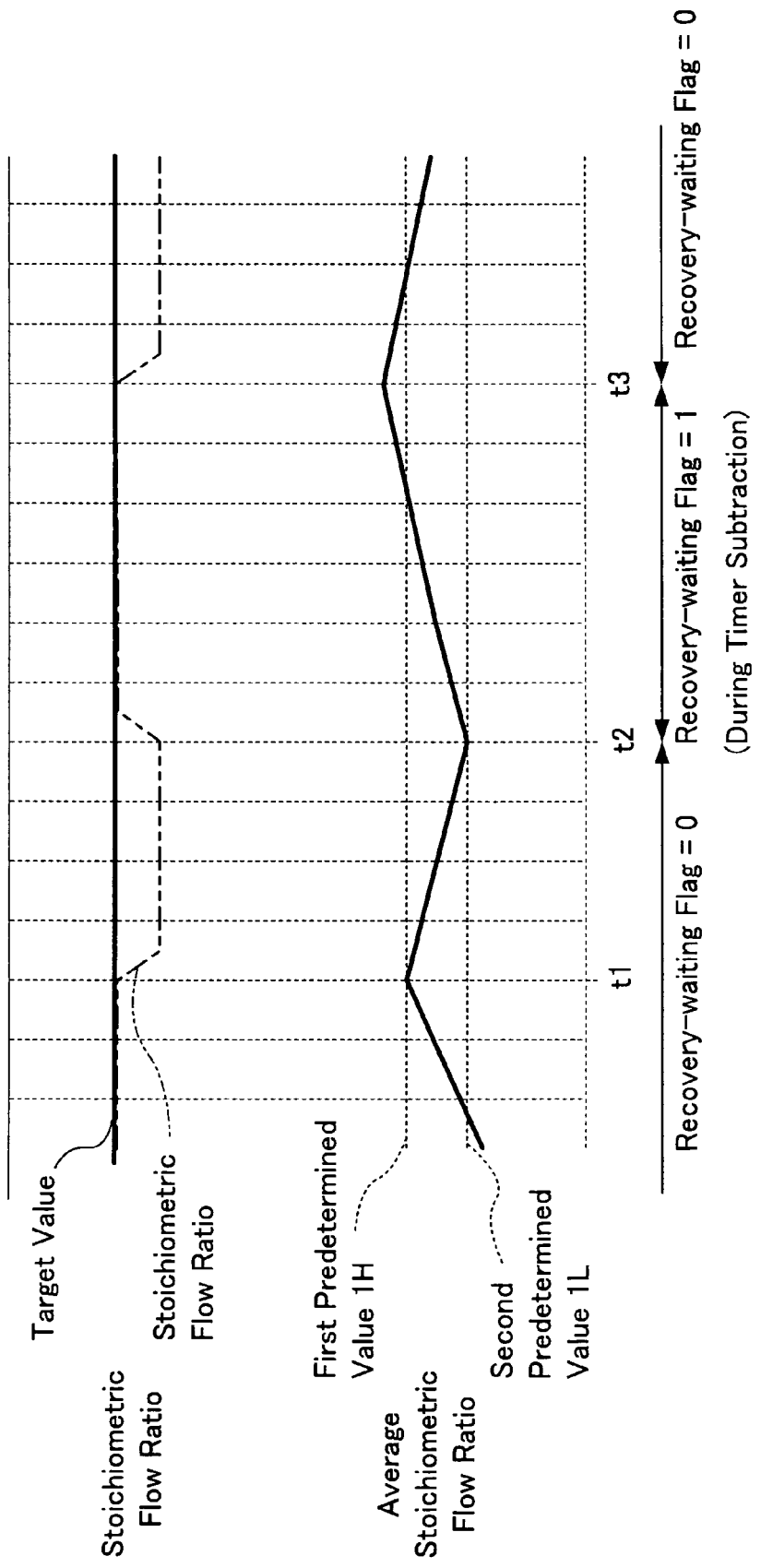
FIG. 4 is a timing chart of the fuel-cell system according to the embodiment.

Referring to FIG. 4, operation of the fuel-cell system 1 will be further described.

First, when setting the stoichiometric flow ratio to a target value after starting of the fuel cell 10, the average stoichiometric flow ratio rises until a time t1. During this time period, the recovery-waiting flag is 0.

Because the average stoichiometric flow ratio is in the middle of rising during this time period, the flow rate of reactive gases is not controlled to reduce even if the average stoichiometric flow ratio is equal to or greater than the second predetermined value 1L.

At the time t1, when the average stoichiometric flow ratio becomes equal to or greater than the first predetermined value 1H, the flow rate of reactive gases is reduced so as to lower the stoichiometric flow ratio below the target value, and the recovery-waiting timer is set.

During a period of time t1 to time t2, though the stoichiometric flow ratio is set to be smaller than the target value, the average stoichiometric flow ratio is greater than the second predetermined value 1L. This is the reason why the flow rate of reactive gases is still reduced so as to lower the average stoichiometric flow ratio. During this period, the recovery-waiting timer is set repeatedly.

At the time t2, when the average stoichiometric flow ratio becomes equal to or smaller than the second predetermined value 1L, the stoichiometric flow ratio is increased to the target value, which causes the average stoichiometric flow ratio to stop falling.

Then, the recovery-waiting flag is set to 1. Since the recovery-waiting timer is not reset, a subtraction of the remaining time of the recovery-waiting timer starts.

During a period of time t2 to time t3, since the stoichiometric flow ratio is set to the target value, the average stoichiometric flow ratio rises continuously. Even if the average stoichiometric flow ratio exceeds the first predetermined value 1H, the stoichiometric flow ratio is not reduced because the recovery-waiting flag is 1.

At the time t3, when the remaining time of the recovery-waiting timer becomes 0, the recovery-waiting flag becomes 0, accordingly. The stoichiometric flow ratio is lowered below the target value again so as to lower the average stoichiometric flow ratio.

This embodiment produces the following effects:

(1) When it is determined that the average stoichiometric flow ratio, which is introduced in the present invention, is equal to or greater than the first predetermined value 1H, the amount of reactive gases supplied to the fuel cell 10 is reduced so as to lower the stoichiometric flow ratio.

In this way, when the average stoichiometric flow ratio is equal to or greater than the first predetermined value 1H, it is possible to allow an enhancement in fuel consumption of the fuel cell 10 by reducing the amount of reactive gases supplied. Particularly, when supplying the reactive gases to the fuel cell 10 using the air compressor 21, power supplied to the air compressor 21 can be reduced, leading to a further reduction in power consumption of the fuel cell 10.

Because selection of a stoichiometric flow ratio is carried out with an average stoichiometric flow ratio as an index, which decreases when the stoichiometric flow ratio has not reached the target stoichiometric flow ratio and increases when the stoichiometric flow ratio meets the target stoichiometric flow ratio, it is possible to prevent frequent changes of the stoichiometric flow ratio, which allows stabilization of the power-generation capacity of the fuel cell 10.

(2) When the reactive-gas reduction part 312 is in operation and an average stoichiometric flow ratio falls to or below the second predetermined value 1L that is smaller than the first predetermined value 1H, a control is carried out to cause the stoichiometric flow ratio to stop falling. In this way, the average stoichiometric flow ratio can be prevented from being equal to or smaller than the second predetermined value 1L. Because reduction of an amount of reactive gases supplied is stopped when power generation is shifting from a stable state to an unstable state, power-generation capacity of the fuel cell 10 can be stabilized.

(3) Reoperation of the reactive-gas reduction part 312 is prohibited before a predetermined time has elapsed after stopping of operation of the reactive-gas reduction part 312. In this way, it is possible to prevent the average stoichiometric flow ratio from becoming the second predetermined value 1L consecutively, eliminating unstable power generation.

While a preferred embodiment of the present invention has been described and illustrated above, it is to be understood that the preferred embodiment is exemplary of the invention and is not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

For example, in the embodiment described above, the control part 31 controls the supply unit 20 so that a current stoichiometric flow ratio is set to a target value. Without being limited thereto, control may be carried out in accordance with the rate between a current stoichiometric flow ratio and a target stoichiometric flow ratio.

What is claimed is:

1. A method of controlling a fuel cell for generating power by a reaction of reactive gases, the method comprising the steps of:
    calculating a target stoichiometric flow ratio required for power generation where a stoichiometric flow ratio is defined as a ratio of an amount of a reactive gas to be supplied to the fuel cell to a necessary amount of the reactive gas in accordance with a required amount of power generation;
    controlling an amount of reactive gas supplied to the fuel cell so that a stoichiometric flow ratio meets the target stoichiometric flow ratio;
    calculating an average stoichiometric flow ratio as an index indicative of stability of power generated by the fuel cell, the average stoichiometric flow ratio decreasing when the stoichiometric flow ratio has not reached the target stoichiometric flow ratio and increasing when the stoichiometric flow ratio meets the target stoichiometric flow ratio; and
    reducing the amount of the reactive gas supplied to the fuel cell so as to lower the stoichiometric flow ratio when the calculated average stoichiometric flow ratio is equal to or greater than a first predetermined value by which the fuel cell is determined to be in stable condition to perform power generation.

2. The method as claimed in claim 1, further comprising:
    stopping execution of the reducing step when the reducing step is carried out and the average stoichiometric flow ratio falls to or below a second predetermined value which is smaller than the first predetermined value.

3. The method as claimed in claim 2, further comprising:
    prohibiting re-execution of the reducing step before a predetermined time has elapsed after stopping the reducing step in the stopping step.

* * * * *